(12) United States Patent
Ranta-Aho et al.

(10) Patent No.: US 6,970,427 B2
(45) Date of Patent: Nov. 29, 2005

(54) METHOD AND APPARATUS FOR IMPLICIT TFC REDUCTION AND L1 ERROR HANDLING

(75) Inventors: Karri Ranta-Aho, Espoo (FI); Antti Toskala, Espoo (FI); Tero Henttonen, Espoo (FI)

(73) Assignee: Nokia Corporation, Espoo (FI)

( * ) Notice: Subject to any disclaimer, the term of this patent is extended or adjusted under 35 U.S.C. 154(b) by 39 days.

(21) Appl. No.: 10/640,414

(22) Filed: Aug. 12, 2003

(65) Prior Publication Data

US 2005/0036449 A1     Feb. 17, 2005

(51) Int. Cl.[7] .............................. H04J 1/16; H04J 3/14; H04J 1/00; H04J 12/26
(52) U.S. Cl. ................... 370/236; 370/230.1; 370/231; 370/233
(58) Field of Search ........................ 370/229, 235–236, 370/449, 465, 468, 230.1–233

(56) References Cited

U.S. PATENT DOCUMENTS

| | | | | |
|---|---|---|---|---|
| 6,574,204 B1 * | 6/2003 | Lee | ............................. | 370/335 |
| 2003/0219037 A1 * | 11/2003 | Toskala et al. | ............. | 370/496 |
| 2004/0001534 A1 * | 1/2004 | Yang | .......................... | 375/143 |

OTHER PUBLICATIONS

Robust feedback scheme for closed loop rate control in E-DCH; TSG-RAN Working Group 1 meeting #32; Marne La Vallee, France, May 19-23, 2003.

* cited by examiner

*Primary Examiner*—Chi Pham
*Assistant Examiner*—Ronald Abelson
(74) *Attorney, Agent, or Firm*—Ware, Fressola, Van Der Sluys & Adolphson LLP

(57) ABSTRACT

A method (20) and corresponding equipment for correcting misalignment of respective pointers in a UE device (11) and a Node B (10) for indicating a maximum allowed rate of uplink from the UE device (11) to the Node B (10).

15 Claims, 2 Drawing Sheets

METHOD AND APPARATUS FOR IMPLICIT TFC REDUCTION AND L1 ERROR HANDLING

TECHNICAL FIELD

The present invention pertains to the field of wireless communication, especially via telecommunication networks according to 3GPP specifications. More particularly, the present invention pertains to uplink performance in the UMTS radio access network, UTRAN, and even more particularly, the invention is related to fast Node B scheduling.

BACKGROUND

An UMTS (Universal Mobile Telecommunication System) network includes a core network of various elements and also a radio access network, called UTRAN (UMTS terrestrial radio access network). A UTRAN includes radio network controllers (RNCs) that control so-called Node Bs, that in turn wirelessly communicate with UE (user equipment) devices, i.e. e.g. mobile phones. UMTS networks are provided and operated as specified by 3GPP (Third Generation Partnership Program) specifications, which are evolving, and which are issued in successive releases.

In the most current evolution, which will issue as release 6, a proposal has been made for a fast Node B controlled scheduling mechanism requiring both the UE and the Node B to individually maintain a data rate pointer for the UE maximum allowed UL (uplink) data rate, as indicated in a transport format combination indicator (TFCI) data object. The data rate pointer is updated using differential signalling (increase/decrease), and so if the UE and the Node B do not have the same understanding of the current pointer value, a Node B command (a granted request or a command without a corresponding request) to increase or decrease the data rate will result in a data rate different than expected by the Node B. According to the proposal, a UE can only request a change of the data rate pointer (using rate request signalling), and the Node B is in control; if it finds a rate request from a UE acceptable, it updates its own pointer entity and signals a rate grant to the UE. Now, if the UE receives a rate grant message erroneously, the UE data rate pointer and the Node B data rate pointer become misaligned. (Additionally, as indicated above, the Node B can also command the UE to decrease its data rate pointer without the UE making a corresponding request, and misalignment can occur in that scenario as well.)

What is needed is a mechanism to ensure that misalignment of the UE and Node B data rate pointers does not occur, or, if it does, that the misalignment is corrected.

DISCLOSURE OF THE INVENTION

Accordingly, in a first aspect of the invention, a method is provided for eliminating a difference in a pointer in a Node B of a wireless telecommunication system indicating a maximum allowed data rate of a UE for uplink transmission of data to the Node B and a corresponding pointer in the UE, the method including: a step in which the Node B detects the rate of uplink by the UE; the method characterized by: a step in which the Node B lowers the pointer in the Node B to the maximum rate used by the UE during a fixed or configurable delay if the UE never transmits at or above the rate indicated by the pointer in the Node B during the fixed or configurable delay In accord with the first aspect of the invention, the method may be further characterized by: a step in which the Node B signals to the UE a command to decrement the pointer in the UE if the rate of uplink as detected is greater than the rate indicated by the pointer in the Node.

Also in accord with the first aspect of the invention, the method may be further characterized by: a step in which a radio network controller entity establishes the amount of delay and then signals the amount of delay to the Node B and the UE.

Also in accord with the first aspect of the invention, the method may be further characterized by: a step in which the amount of delay is defined in a standard and the amount of delay is built into the Node B and the UE.

Sill also in accord with the first aspect of the invention, the method may be further characterized in that the UE is operative according to a rule prohibiting the UE from requesting an increment to the pointer in the UE unless the UE is transmitting at the maximum allowed rate according to the pointer in the UE, and may still also be further characterized by: a step in which, if the UE signals to the Node B a request for a rate increase and the rate of uplink is less than the rate indicated by the pointer in the Node B, the Node B either: signals a command to increment the pointer in the UE but keeps the pointer in the Node B unchanged; or rejects the request by the UE to increment the pointer in the UE and decreases the pointer in the Node B; or rejects the request, signals command to decrement the pointer in the UE, and sets the pointer in the Node B to indicate a rate below the rate used by the UE when transmitting the increment request.

Also in accord with the first aspect of the invention, the method may be further characterized in that the UE is operative according to a rule that the UE shall ignore any pointer increment or decrement command from the Node B that would result in the pointer in the UE indicating a rate outside of a set of rates including all allowed or possible rates in a transport format combination set (TFCS).

Also in accord with the first aspect of the invention, signalling from the Node B to the UE may be either differential or explicit (absolute, i.e. as opposed to differential) signalling.

In a second aspect of the invention, a UE device is provided operative according to steps in the method provided according to the first aspect of the invention and indicated as performed by a UE device.

In a third aspect of the invention, a Node B device is provided operative according to steps in the method provided according to the first aspect of the invention and indicated as performed by a Node B device.

In a fourth aspect of the invention, a system is provided, comprising a plurality of UE devices and at least one Node B device, characterized at least in that the Node B device is according to the third aspect of the invention.

In a fifth aspect of the invention, a computer program product is provided, comprising: a computer readable storage structure embodying computer program code thereon for execution by a computer processor in a Node B device, with said computer program code characterized in that it includes instructions for executing the steps in the method according to the first aspect of the invention and indicated as executed by a Node B device.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention provides what can be characterized as differential data rate restriction signalling for accommodating the possibility of a misalignment in the data rate pointer (indicating the maximum allowed rate for uplink) maintained by a UE and a corresponding data rate pointer maintained by the controlling Node B, a misalignment made more likely because of using differential signalling between a controlling Node B and the controlled UEs in regulating the respective data rate pointers of the UEs. The invention relies in some cases on a timer in both the UE and the Node B for timing a fixed or configurable delay that can be controlled by the serving RNC and signaled by the higher (than the transport layer) protocol layers (of the serving RNC) to (corresponding layers of) the Node B and to the UE via the Node B. As indicated below, the invention also encompasses not only differential signaling by the Node B, but also explicit signaling.

Figure 1:
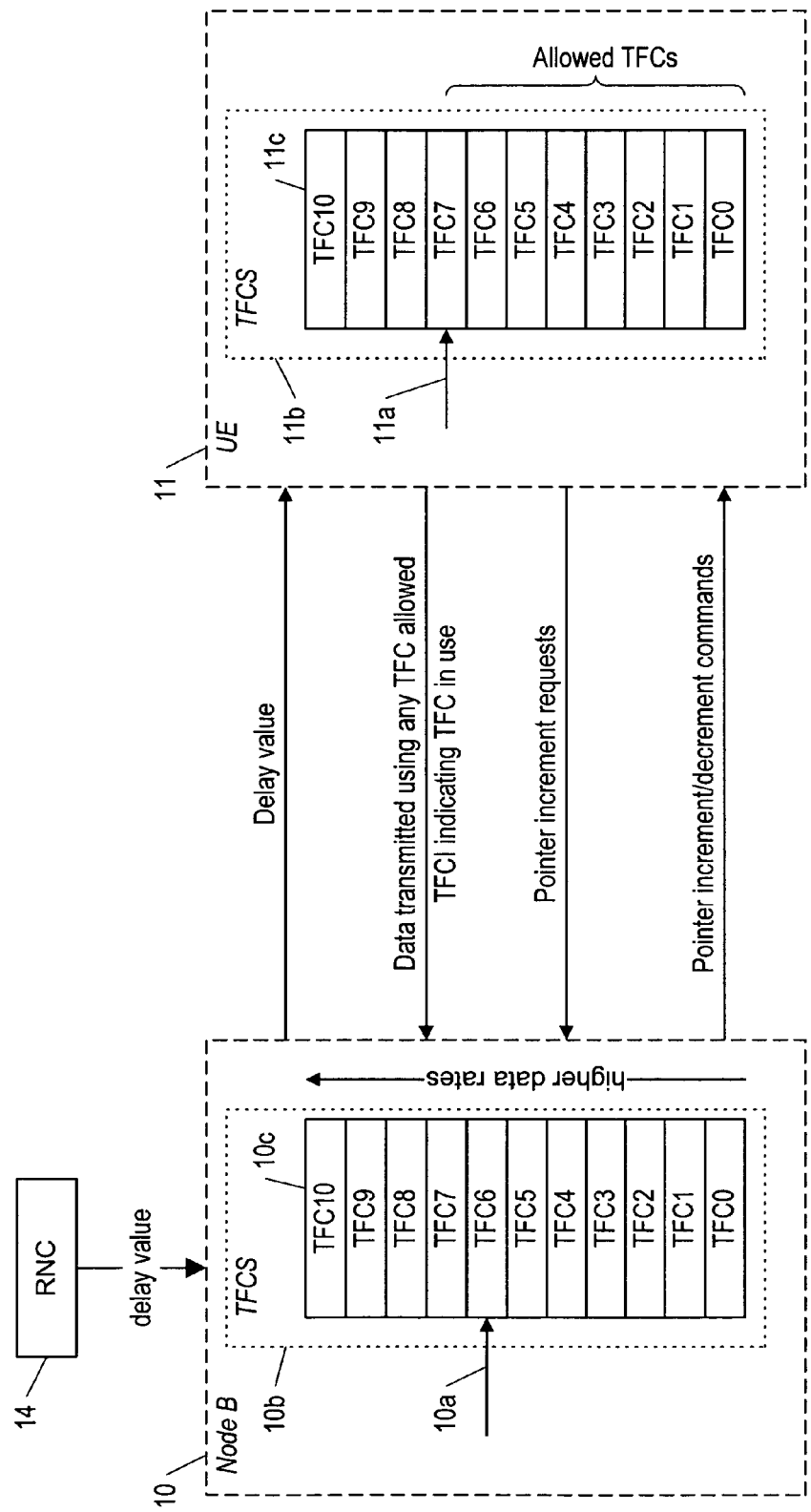
FIG. 1 is a block diagram/flow diagram of a UE device and a Node B communicating data and related signaling, some according to the prior art and some according to the invention.

As shown in FIG. 1, a UE 11 receives a delay value from a Node B 10, which has received the delay value from an RNC 14. Both the Node B and the UE maintain a TFCS (Transport Format Combination Set) 10a 11b (created by the serving RNC 14 and signaled to the Node B and to the UE) including a set of TFCs 10c 11c each of which correspond to a different data rate for uplink transmissions (from the UE to the Node B), arranged in order of increasing data rates, with a pointer 10a 11a indicating a particular one of the TFCs, and so indicating the corresponding data rate (which then in turn indicates a corresponding transmit power). A pointer is typically a data object used by executable code to point to a location in memory where a value of another data object is stored, in the case at hand, the other data object being a value for rate of uplink, as discussed below. However, the term pointer should be understood here as meaning any indicator of a value of a data object corresponding to a rate of uplink. For example, the term pointer as used here can mean an integer value used to indicate a particular entry in a one-dimensional array of different possible uplink values.

Still referring to FIG. 1, according to the proposal in 3GPP, the UE may transmit in the uplink at or below the data rate (TFC) indicated by the UE pointer 11a (i.e. the instance/copy of the UE pointer in the UE, as opposed to the instance of the UE pointer in the Node B), which should be the same as the Node B pointer 10a (i.e. the instance/copy of the UE pointer in the Node B, as opposed to the instance of the UE pointer in the UE), but which sometimes differs e.g. due to signalling errors, i.e. becomes misaligned; and the UE may request a rate increase from the Node B, and may receive a pointer increment command in response. The Node B may also send an increment or decrement command to the UE without any UE request. The initial pointer value is signaled by the RNC to the Node B and to the UE.

The invention accommodates several cases of misalignment. In a first case—case 1—the misalignment is such that the data rate pointer value in the UE indicates a higher data rate than the data rate pointer value in the Node B. If in this case the UE transmits with a higher data rate than is actually allowed (according to the Node B data rate pointer), the invention provides that the Node B is to immediately signal the UE to decrease its pointer value, but does not change its own data rate pointer.

In a next case—case 2a—the date rate pointer value in the UE indicates a lower data rate than the date rate pointer value in the Node B. If the UE transmits with a lower data rate than is allowed by the Node B data rate pointer, the UE and the Node B can individually reduce their respective data rate pointer values after the delay. The UE and Node B may use a timer for timing the fixed or configurable delay/period, a timer that can be reset (to zero) at the end of each delay/period, or at any time during a delay/period.

If the delay is relatively long, the UE may use several different data rates during the delay. Since the misalignment is such that the UE data rate pointer is low, all the data rates used by the UE would be below the maximum allowed data rate indicated by the data rate pointer value in the Node B, and so according to the invention the pointer value is adjusted in both the UE and in the Node B to indicate the highest data rate used by the UE during the delay. Note that since the pointer value in the UE is assumed (for this case) to be lower than in the Node B, the procedure provided by the invention may result in the pointer in the Node B being lowered but the pointer in the UE being left unchanged (if the UE transmits at least once during the delay at the maximum data rate allowed according to its pointer).

In a next (related) case—case 2b—the pointer value in the UE indicates a lower data rate than the pointer value in the Node B as in the second case, but in addition, the UE requests a higher data rate. In such a case, the invention provides an additional rule: The UE is allowed to ask for a pointer increment only if it is simultaneously transmitting with the maximum data rate allowed according to the UE data rate pointer value. With such a rule, when the pointer value in the UE is lower than the pointer value in the Node B and UE is requesting a higher data rate, the Node B can recognize that there is a pointer misalignment (and, in addition, can know what the misalignment is). When the UE transmits with the highest data rate indicated by its pointer and asks for a pointer increment from the Node B, the Node B receives the transmission with a lower than the maximum data rate according to the Node B pointer (by assumption for this case), and so, according to the invention, to eliminate the misalignment the Node B can either: signal a pointer increment command to the UE but keep its own pointer value unchanged; or reject the UE pointer increment request and instead decrease its own pointer value to the value used by the UE in its increment request; or reject the request, signal a decrement command and set its pointer value to indicate one rate below the rate used by the UE when transmitting the increment request. In any case, according to the invention, the timer is reset in the UE to start from zero but is not activated to start counting until the UE uses a lower rate, and also reset in the Node B but again not activated to start counting again until the UE uses a lower rate.

In a next case—case 3—the UE receives a pointer adjustment command that cannot be fulfilled. In such a case, according to the invention, if the UE receives a pointer decrement command from the Node B and its pointer is already indicating the minimum allowed rate (according to the minimum set of TFCs of the TFCS), the UE ignores the command. If the UE receives a pointer increment command from the Node B and its pointer value is indicating the maximum rate (per the available TFCS, i.e. the pointer value is either indicating the highest data rate TFC of the TFCS or the usage of all the higher data rate TFCs is restricted by higher layers), then according to the invention the UE also ignores the command. Thus, a UE according to the invention is to ignore any pointer increment or decrement command from the Node B 10 that would result in the UE pointer (in the UE) indicating a rate outside of the range of rates provided by the TFCS on file in the UE 11. If a pointer misalignment results in the Node B issuing such a command (i.e. a command that cannot be fulfilled because the pointer would then point to null), the Node B pointer and the UE pointer will be more aligned if the UE ignores the command, regardless of whether the command is an increment or a decrement command.

Note that according to the prior art, a minimum TFC set is specified by the RNC as consisting of such TFCs/rates that can never be blocked by any means. For example, zero data rate TFC (nothing except control channel is sent) cannot be blocked, and usually there is also some non-zero data rate TFC that cannot be blocked to ensure that the UE can always send at least something in any situation. Thus, a TFC from the minimum TFC set can always be selected, regardless of any power requirements or UE pointer restrictions. Of course, the RNC may change the minimum TFC set if it desires, but once in effect, a Node B cannot prevent a UE from using a TFC from the minimum TFC set. Of course the Node B would not even try to prevent the UE pointer from pointing at a TFC/rate in the minimum TFC set except because of errors.

In connection with case 3, the RNC may signal the UE not to use some rates/TFCs in the TFCS (the set of rates/TFCs), in which case these rates/TFCs are not to be made available by the pointer. In addition, some TFCs of the TFCS may be power restricted, i.e. the UE does not have enough power resources available to transmit them, in which case these also would not be used by the UE and the pointer in the UE would not make them available either. In conformance to the rule for case 3, the UE will ignore any command that would have the pointer in the UE point to either a rate excluded by the RNC from the TFCS or a rate for which the UE does not have adequate power.

In some embodiments, in case the UE is not able to utilize the maximum data rate indicated by the pointer in the Node B (and so transmits at less than the so-indicated maximum rate), the pointer value in the Node B is automatically decreased after a certain delay has passed, saving signaling. Also, if the pointer in the UE is greater than the pointer in the Node B, and the UE transmits at the rate of the pointer in the Node B, then (according to the previous rule) after a predetermined delay the UE lowers its pointer to the value of the pointer in the Node B, again saving signalling.

The respective procedures provided by the invention for case 1 and case 2b are pure physical layer (i.e. L1) signalling error handling procedures. The procedure provided by the invention for case 2a can be considered a way of reducing a pointer value when the UE does not need as high a data rate as the pointer allows; the procedure in this case just happens to recover from L1 signalling errors. The procedure for case 3 is an extra precaution that takes care of special L1 signalling errors and also possible system misbehavior.

Figure 2:
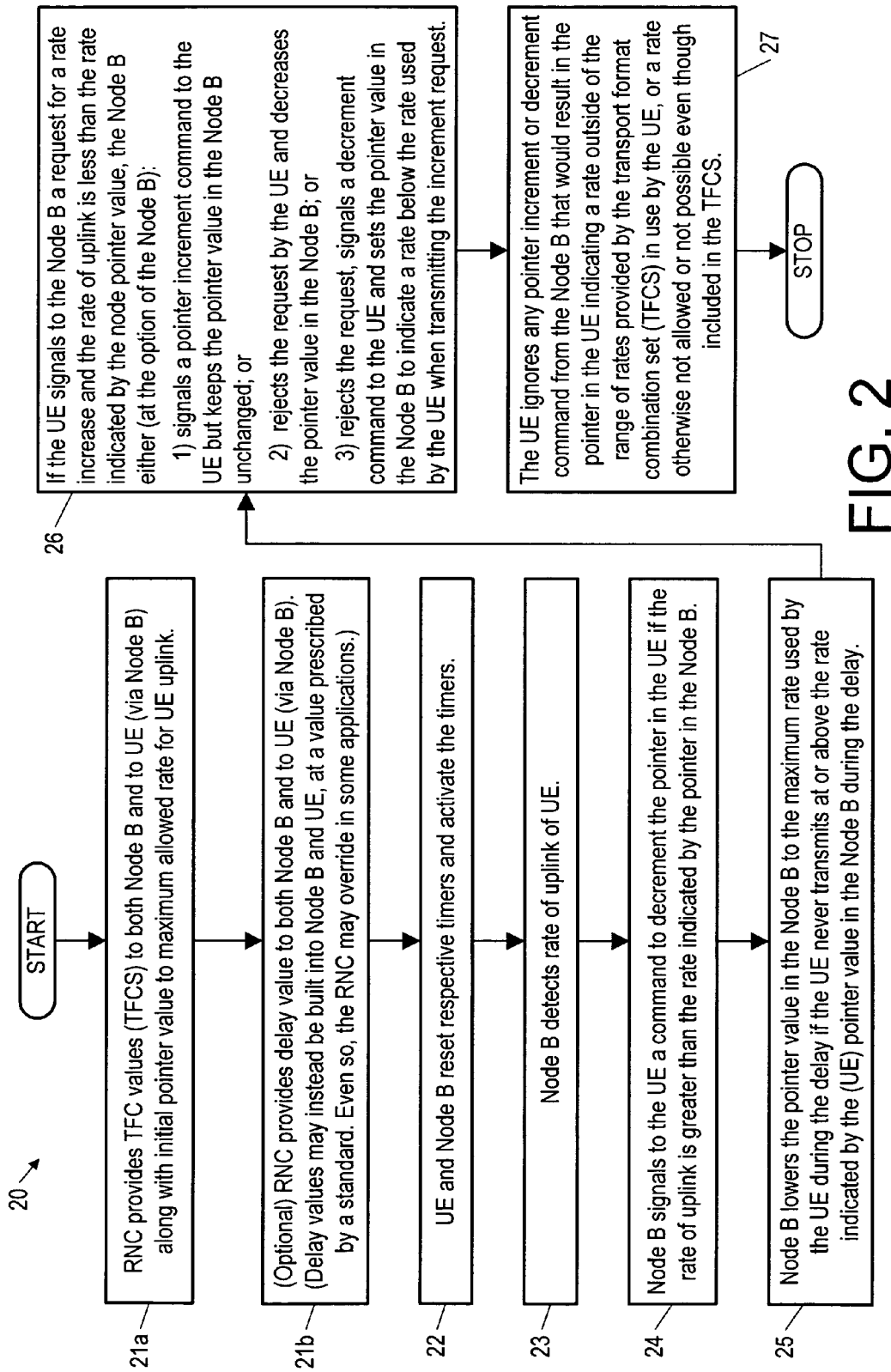
FIG. 2 is a flow chart of UE/Node B signalling to eliminate data rate pointer misalignment, according to the invention.

Referring now to FIG. 2 (and also to FIG. 1), the invention is shown in terms of a scenario (series of actions or steps taken by the RNC, Node B, and UE, steps that could, for the most part, be taken in any order and may not ever occur, depending on what errors or circumstances pertain, but are provided here as illustrative of steps by which the various devices—RNC, Node B, and UE—are operative according to the invention) including a first step 21a in which an RNC 14 provides TFC values (TFCS, i.e. a set of TFCs) to both a Node B 10 and to a UE 11 (via the Node B) along with an initial pointer value to maximum allowed rate for UE uplink. In a next (optional) step 21b, the RNC provides delay value to both the Node B and to the UE (via the Node B). (Delay values may instead be built into the Node B and the UE, at a value or according to an algorithm prescribed by a standard. Even so, the RNC may override them in some applications or in some circumstances.) In a next step 22, the UE and Node B reset respective timers and activate the timers. In a next step 23, the Node B detects a rate of uplink used for uplink by the UE. In a next step 24, the Node B signals to the UE a command to decrement the pointer in the UE if the rate of uplink is greater than the rate indicated by the pointer in the Node B. In a next step 25, the Node B lowers the pointer value in the Node B to the maximum rate used by the UE during the delay if the UE never transmits at or above the rate indicated by the (UE) pointer value in the Node B during the delay.

Still referring to FIG. 2 (and also to FIG. 1), in a next step 26, if the UE signals to the Node B a request for a rate increase and the rate of uplink is less than the rate indicated by the pointer value in the Node B, the Node B either (at the option of the Node B):

1) signals a pointer increment command to the UE but keeps the pointer value in the Node B unchanged; or
2) rejects the request by the UE and decreases the pointer value in the Node B; or
3) rejects the request, signals a decrement command to the UE and sets the pointer value in the Node B to indicate a rate below the rate used by the UE when transmitting the increment request.

Still referring to FIG. 2 (and also to FIG. 1), in a next step 27, the UE ignores any pointer increment or decrement command from the Node B that would result in the (UE) pointer in the UE indicating a rate outside of the range of rates provided by the transport format combination set (TFCS) in use by the UE, or a rate otherwise not allowed or not possible even though included in the TFCS.

Although in the above-described embodiments the Node B uses differential signalling to control the (UE) pointer in the UE (i.e. the Node B signals e.g. increment the pointer value by one unit), the invention also comprehends embodiments in which explicit (absolute) signalling is used by the Node B (i.e. the Node B signals a new pointer value p). In such embodiments, more signaling content (information per signal) is needed and so it might not be possible to signal as frequently, with the result that the pointer is not as finely controlled (less corrections per unit time) and error handling is therefore more important since a next command after a command received with an error will not arrive for a longer time. In such embodiments, as in the above description, if the UE never uses the maximum allowed value during some appropriate period of time, the Node B can infer that the UE always uses a lower rate because of an error (signalling error) in transmission of the maximum allowed rate, or because of a power limitation. Also as described above, explicit commands received by the UE from the Node B requiring a pointer value outside of the allowed range can be considered by the UE as obsolete (i.e. the UE can ignore the command or change to some predefined data rate—either something signaled by the RNC to both the UE and to the Node B, or something that is specified in the standard somehow—e.g. the lowest data rate allowed). Thus, in general in the description here, a command by the Node B to the UE to increment or decrement the UE pointer can be either a differential command or an explicit command.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for eliminating a difference in a pointer in a Node B of a wireless telecommunication system indicating a maximum allowed data rate of a UE for uplink transmission of data to the Node B and a corresponding pointer in the UE, the method including:
   a step in which the Node B detects the rate of uplink by the UE;
   the method characterized by:
   a step in which the Node B lowers the pointer in the Node B to the maximum rate used by the UE during a fixed or configurable delay if the UE never transmits at or above the rate indicated by the pointer in the Node B during the fixed or configurable delay.

2. The method of claim 1, further characterized by:
   a step in which the Node B signals to the UE a command to decrement the pointer in the UE if the rate of uplink as detected is greater than the rate indicated by the pointer in the Node B.

3. The method of claim 1, further characterized by:
   a step in which a radio network controller entity establishes the amount of delay and then signals the amount of delay to the Node B and the UE.

4. The method of claim 1, further characterized by:
   a step in which the amount of delay is defined in a standard and the amount of delay is built into the Node B and the UE.

5. The method of claim 1, further characterized in that the UE is operative according to a rule prohibiting the UE from requesting an increment to the pointer in the UE unless the UE is transmitting at the maximum allowed rate according to the pointer in the UE, and also further characterized by:
   a step in which, if the UE signals to the Node B a request for a rate increase and the rate of uplink is less than the rate indicated by the pointer in the Node B, the Node B either: signals a command to increment the pointer in the UE but keeps the pointer in the Node B unchanged; or rejects the request by the UE to increment the pointer in the UE and decreases the pointer in the Node B; or rejects the request, signals command to decrement the pointer in the UE, and sets the pointer in the Node B to indicate a rate below the rate used by the UE when transmitting the increment request.

6. The method of claim 1, further characterized in that the UE is operative according to a rule that the UE shall ignore any pointer increment or decrement command from the Node B that would result in the pointer in the UE indicating a rate outside of a set of rates including all allowed or possible rates in a transport format combination set (TFCS).

7. The method of claim 1, wherein signalling from the Node B to the UE is differential signalling.

8. The method of claim 1, wherein signalling from the Node B to the UE is explicit signalling.

9. A UE device, comprising a pointer for indicating a maximum allowed rate of uplink, and characterized in that it is operative according to a rule that the UE device lowers the pointer to the maximum rate used by the UE during a fixed or configurable delay if during the delay the UE never transmits at or above the maximum allowed rate indicated by the pointer.

10. A Node B device including a pointer indicating a maximum allowed rate of uplink by a UE device, the Node B device comprising:
    means by which the Node B detects the rate of uplink by the UE device;
    characterized in that the Node B device comprises:
    means by which the Node B lowers the pointer in the Node B to the maximum rate used by the UE during a fixed or configurable delay if the UE never transmits at or above the rate indicated by the pointer in the Node B during the delay.

11. The Node B device of claim 10, further characterized by:
    means for timing the fixed or configurable delay; and
    means by which the Node B device signals to the UE device a command to decrement a pointer in the UE device and used by the UE device to indicate to the UE device a maximum allowed rate of uplink, the signal to decrement being issued in case the rate of uplink detected by the Node B device is greater than the rate indicated by the pointer in the Node B device.

12. A system, comprising a plurality of UE device and at least one Node B device, characterized in that the Node B device is as recited in claim 10.

13. A system, comprising a plurality of UE device and at least one Node B device, characterized in that the Node B device is as recited in claim 11.

14. A computer program product comprising: a computer readable storage structure embodying computer program code thereon for execution by a computer processor in a Node B device, with said computer program code characterized in that it includes instructions for executing the steps recited in claim 1.

15. A computer program product comprising: a computer readable storage structure embodying computer program code thereon for execution by a computer processor in a Node B device, with said computer program code characterized in that it includes instructions for executing the steps recited in claim 2.

* * * * *